United States Patent [19]

Jung et al.

[11] Patent Number: 4,516,175
[45] Date of Patent: May 7, 1985

[54] SCANNING METHOD AND SCANNING DIAPHRAGM FOR SUPPRESSING MOIRÉ IN THE SCANNING OF RASTERED MASTERS

[75] Inventors: Eggert Jung, Schoenberg; Heinrich Wadle, Neumuenster, both of Fed. Rep. of Germany

[73] Assignee: Dr. Ing. Rudolf Hell GmbH, Fed. Rep. of Germany

[21] Appl. No.: 379,999

[22] Filed: May 19, 1982

[30] Foreign Application Priority Data

May 20, 1981 [DE] Fed. Rep. of Germany ....... 3120030

[51] Int. Cl.³ .............................................. H04M 1/40
[52] U.S. Cl. .................................... 358/283; 358/285; 358/293

[58] Field of Search ............... 358/285, 283, 294, 200, 358/293

[56] References Cited

U.S. PATENT DOCUMENTS 3,775,559  11/1973  Vieri ..................................... 358/294
4,333,112   6/1982  Matsumoto ......................... 358/293
4,336,558   6/1982  Lew ..................................... 358/293

Primary Examiner—John C. Martin
Assistant Examiner—Edward L. Coles
Attorney, Agent, or Firm—Hill, Van Santen, Steadman & Simpson

[57] ABSTRACT

A scanning method for already rastered masters in reproduction technology uses a special diaphragm for avoiding Moiré effects in the re-recording.

6 Claims, 13 Drawing Figures

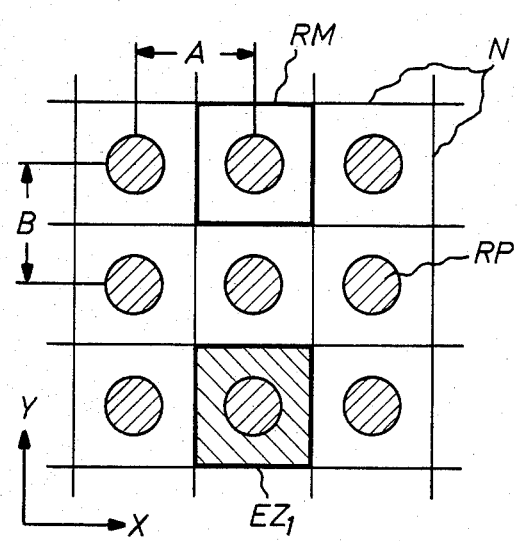
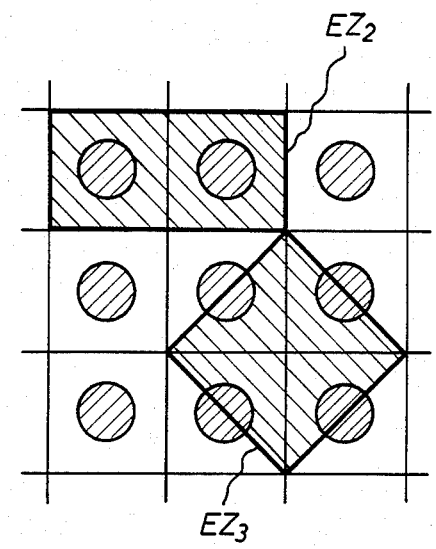
Fig. 1    Fig. 2
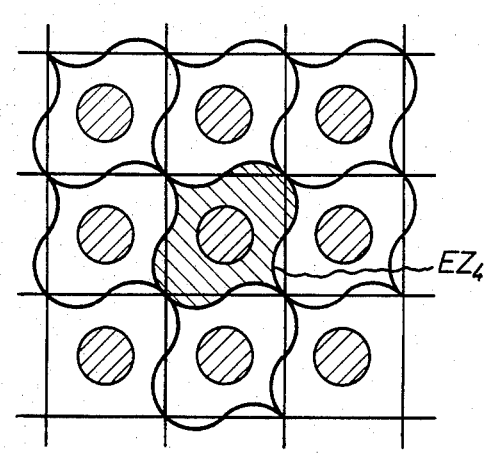
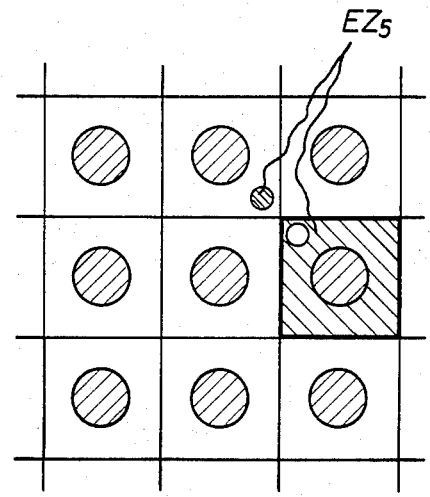
Fig. 3    Fig. 4

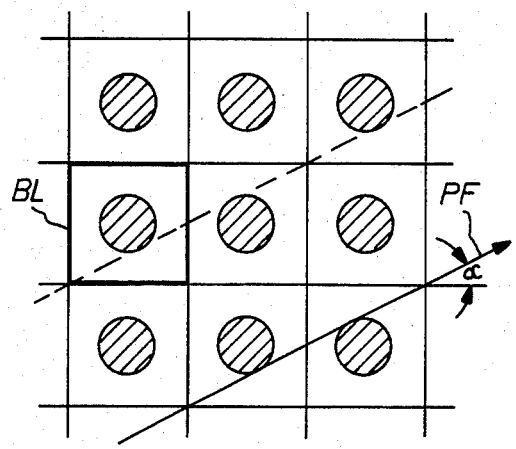
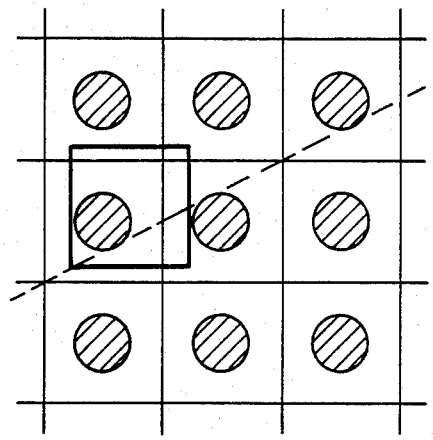
Fig. 5         Fig. 6
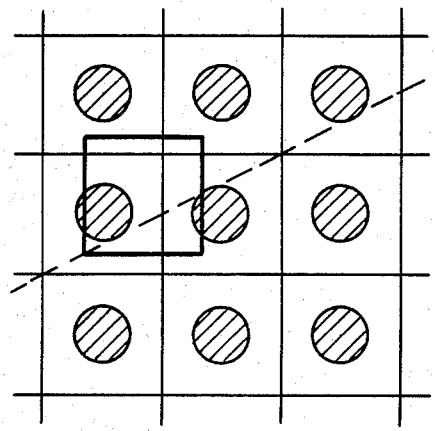
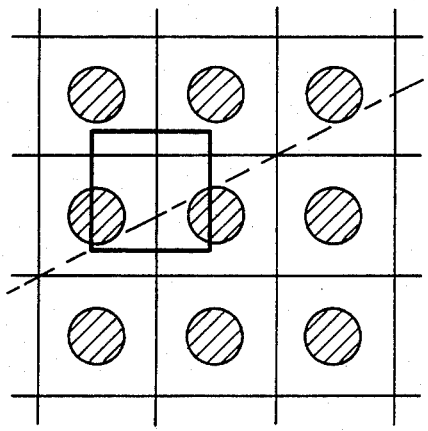
Fig. 7         Fig. 8

SCANNING METHOD AND SCANNING DIAPHRAGM FOR SUPPRESSING MOIRé IN THE SCANNING OF RASTERED MASTERS

BACKGROUND OF THE DISCLOSURE

1. Field of the Invention

The present invention relates in general to the field of reproduction technology, and particularly to the field of printing technology wherein the scanning is carried out on the basis of already rastered masters for later reproduction.

2. Prior Art

In electron-optical scanning of rastered masters on scanners and graving devices, the problem exists that a disruptive Moiré arises due to the superimposition of the master raster on the one hand and the raster added on the other hand during recording in the machine. During the scanning, a small image point from a uniformly illuminated master location is imaged by means of a diaphragm onto the sensitive surface of an electronic light receiver which generates the electronic signal for the further processing and, finally, the recording.

When the size of the imaged spot is not large in comparison to the raster spacing of a rastered master, then the repetition frequency of the raster points running or moving by the scanning optics during the scanning usually appears in the output signal of the light receiver. This unwanted frequency interferes with the frequency which is added to the brightness signal for rastering the recording.

A method for avoiding Moiré, which occurs during the above-mentioned scanning, is disclosed in U.S. patent application Ser. No. 246,160, filed Mar. 23, 1981, whose disclosure is incorporated by reference thereto. The method of this above-mentioned application prevents or suppresses the raster structure of the master and thus the undesired freqency in the image signal by placing the scanning optics out of focus by a certain amount. In order to avoid the loss of focus which occurs, the loss of sharpness is at least partially compensated in this method with the assistance of an electronic unsharpmasking.

A corrective method is known from the handbook, *Agfa-Gevaert, Grafisches Material, Halbtonfotografie*, 12, 1969, pages 132–137. In this method, the master is de-rastered by means of diffraction at diaphragms. In this method, the diaphragms are designed and employed for the simultaneous imaging of the entire master. Thus, these diaphragms are not suitable for the point-wise and line-wise scanning of a master as utilized in electronic reproduction devices.

SUMMARY OF THE INVENTION

The present invention provides a scanning method and a diaphragm, which allow an image rastered in any raster angle and in any raster configuration to be employed as the master in reproduction technology without either disruptive Moiré or inadmissible loss of focus occurring in the re-recording, even when this takes place either unrastered, in a different raster spacing, at a different raster angle, or in a different raster configuration. To accomplish this goal the present invention is directed to an improvement in a diaphragm and a method of opto-electronic image scanning to prevent Moiré in the recorded image when scanning a master comprising the steps of clamping a master with a raster grid with raster meshes, providing an electronic light receiver having a light sensitive surface and a diaphragm with an aperture to allow light, which is emitted by the illuminated master, to be received by said sensitive surface to generate an electronic signal for further processing, said aperture having a shape and size corresponding to an elementary cell of a plurality of cells, said cells having an arbitrarily contoured area of at least the area of one raster mesh, the raster grid of the master being covered without any overlapping and without gaps by the totality of said elementary cells and each single elementary cell being aligned in such a manner, that the relative positioning of elementary cells and raster meshes is constant over the area of the whole master, said clamping of the master positioning the master with the aperture of said diaphragm being aligned to execute the scanning process approximately parallel to the alignment of the elementary cells in the raster grid of the master and arbitrarily moving the diaphragm and master relative to each other to provide the scanning.

BRIEF DESCRIPTION OF THE DRAWINGS

FIG. 1 illustrates a raster mesh and elementary cell of a rastered master in accordance with the present invention;

FIGS. 2, 3 and 4 illustrate examples of elementary cells; and

FIGS. 5 through 12 illustrate various phases of the scanning operation in accordance with the present invention.

DESCRIPTION OF THE PREFERRED EMBODIMENTS

Figure 1A:
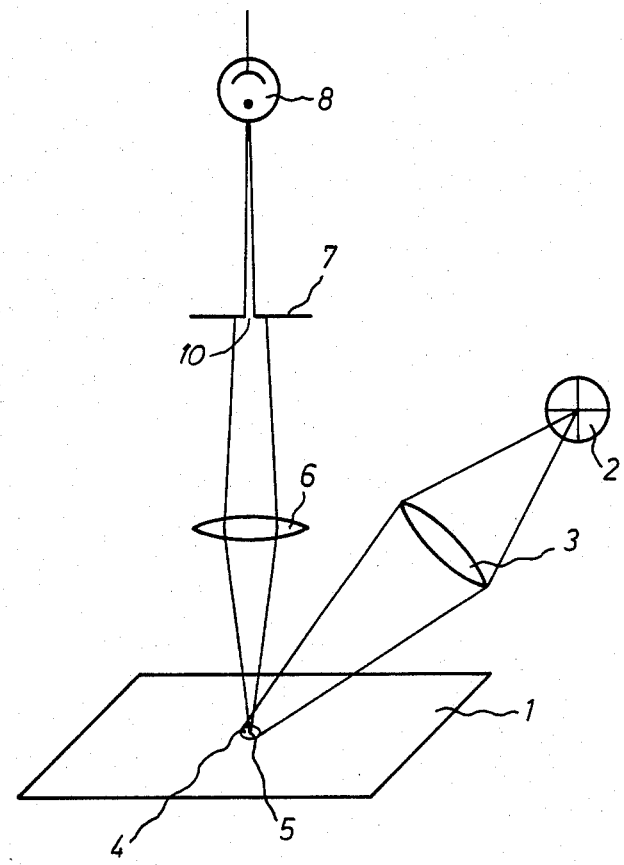
FIG. 1a is a diagrammatic illustration of a device for opto-electronic image scanning according to the present invention.
Figure 9:
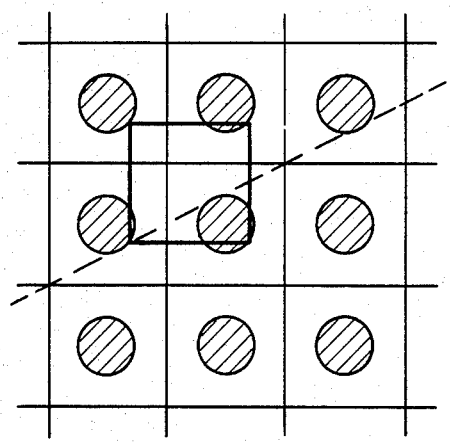
Figure 10:
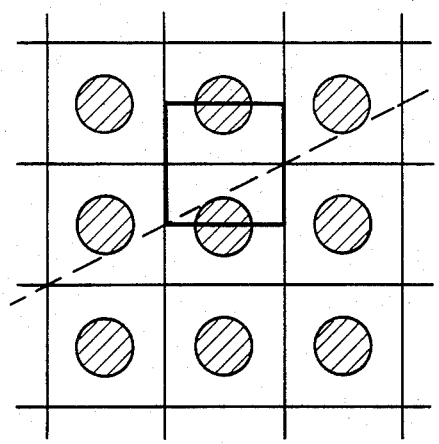
Figure 11:
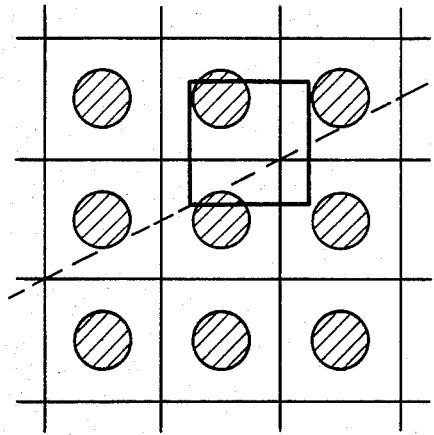
Figure 12:
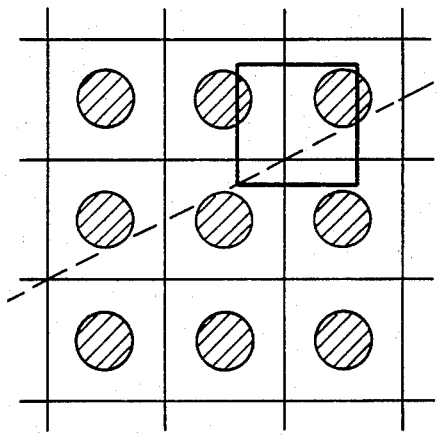

The principles of the present invention are particularly useful when incorporated in an aperture of the diaphragm of a suitable shape and size to define a scanning spot of a size of an elementary cell $EZ_1$ of FIG. 1 and which aperture is oriented relative to the raster of the master. An opto-electronic image scanning device of FIG. 1a illuminates a master 1, which has a raster grid clamped thereon in a region of a small spot 4 by projection light from a source 2 through illumination optics or lens 3 onto the master. A scanning optics 6 images the respectively scanned spot 5 onto a light receiver 8 with the light-sensitive surface which converts the brightness values for further processing. A scanning diaphragm 7 with an aperture 10 allows only the reflected light of a very small point of the master to impinge on the light receiver 8, because a loss of contour sharpness would otherwise occur in the reproduction. The master 1 and the optical scanning device of the elements 2, 3, 6, 7 and 8 are moved relative to one another for scanning such that the entire master is scanned line-by-line with a line spacing that approximately corresponds to the size of the point 5.

The discussion of this invention is based on a periodic master raster in which any mesh sizes and any angularities are allowed. The optical density progression of the individual half-tone dots or raster points can then be described by a function $\phi(X, Y)$. When one observes this function over a surface with a constant tonal value, then the function is periodic and will have a period A in the X direction and a period B in the Y direction, see FIG. 1, whereby the coordinates X and Y can also be skewed. In order to eliminate the raster period from the scanning signal, the scanning spot defined by the aperture of the diaphragm can be a rectangle when the coordinates are perpendicular and a parallelogram with skewed coordinates with the edges n×A and m×B, whereby n and m are natural numbers and can be aligned parallel to the axes of the coordinate system.

A further possibility, for example, consists in selecting the rectangle or, respectively, parallelogram in such manner that the diagonals have the length n×2A and m×2B and are likewise aligned parallel to the axes (X, Y). When, in the first example, one selects n=1 and m=1, then one obtains a scanning spot, which allows a Moiré-free scanning in any raster with optimum image sharpness.

As shown below, diaphragms can also be allowed whose border for the aperture is not straight-line and whose aperture need not be a coherent surface. Angular errors can even be allowed in the alignment of the aperture of the diaphragm relative to the axes, so that satisfactory results are still achieved in most uses of the diaphragm.

In FIG. 1, a master raster, which is scanned with the method just described, is illustrated. It can be generally described by a two-dimensional screen consisting of individual raster meshes which have centers in which the centers of the half-tone dots or raster points lie. Such a raster screen can be constructed of elementary cells and elementary cell is a term which can be defined as follows: the surface of an elementary cell corresponds to the surface of one or more raster meshes of the master raster. The elementary cells can be arbitrary bordered, continuous or non-continuous congruent surfaces whose totality covers the grid network of the master gap-free and without overlap and each individual elementary cell is oriented in such manner that the relative position of the elementary cell to the raster mesh is the same over the entire grid network of the master.

As already mentioned, such a master grid network N with the raster spacings A, B and the half-tone dots or raster points RP is illustrated in FIG. 1. A raster mesh RM is emphasized by thicker lines in FIG. 1 and an elementary cell $EZ_1$ is illustrated in this grid network. As can be seen from this specific example, the elementary cell $EZ_1$ is selected in such manner here that it coincides with the raster mesh RM.

Two further examples of elementary cells are illustrated in FIG. 2. An elementary cell $EZ_2$ has the shape of a rectangle and extends over two adjacent meshes. An elementary cell $EZ_3$ is a square, which is inclined by 45° relative to the raster direction and, just like $EZ_2$, consists of four half raster meshes.

In FIG. 3, a different shape of elementary cells is illustrated. An elementary cell $EZ_4$ provides an example of a shape which is not limited by straight lines but which is a continuous shape. As can be seen, its totality likewise covers the entire grid network in accordance with the definition.

In FIG. 4, an example of an elementary cell $EZ_5$ with a non-continuous surface is illustrated. Other elementary cells with non-continuous surface are also possible insofar as they meet the aforementioned definition criteria.

The shape and size of the actual aperture of the scanning diaphragm is derived from such elementary cells. Because the raster mesh in electron-optical image scanning is imaged over an optical system onto the light receiver whose imaging scale as a rule is not 1:1, the aperture of the diaphragm, in terms of its dimensions, does not necessarily have the actual size of the elementary cell. The actual aperture is a similar image of the elementary cell which corresponds to the imaging scale.

In FIGS. 5 through 12, various successive phases of a master scanning, which for purpose of better understanding is based on the simple, quadratic diaphragm aperture and elementary cell arrangement of FIG. 1 are illustrated. In this example. the scanning starts and proceeds from FIG. 5, with an aperture BL of a diaphragm being moved relative to the master along the direction of an arrow PF. One can easily see that the ratio of black and white surface components, presuming identical half-tone dot or raster point size, within the blanked-out area is independent of the position of the diaphragm in the individual phases of this movement which are illustrated. Thus, the spatial frequency of the master raster is eliminated from the scanning signal. This even applies, as the illustrations show, when the relative motion between diaphragm and master ensues at any angle α relative to the coordinates of the raster, as the broken line in FIGS. 6 through 12 indicates.

In modern electronic reproduction devices, the relative motion between master and scanning element normally arises in that the master is chucked or held onto a rotating drum and the scanning element moves either continuously or step-wise past the drum in an axial direction. By so doing, the scanning ensues either in the form of a helix with a small slope or with parallel circumferential spaced lines. The parallel lines is also the case in flat bed scanners. When, for example, the master is a rectangular image rastered at 30°, whose edges are chucked to the drum in a circumferential direction, then a relative movement as illustrated in FIGS. 5 through 12 will occur during scanning.

It is of significance in the scanning operation that the aperture of the diaphragm is aligned relative to the rastered master in accord with the elementary cell from which it is derived. However, as practice has shown, it is not a matter of high precision.

In contrast to the elementary cell defined above, the aperture of the diaphragm may cover the master with overlap or also cover it with interstices. In the former case, finer resolution is achieved, being, for example, of significance when the recording is to ensue in a raster which is approximately as fine or finer than the master but under a different raster angle. The reverse case is advantageous for its time-saving when a recording is to be made in a coarser raster.

In principle, the scanning diaphragm with the aperture can be manufactured in the standard manner, for instance, by punching, by etching, by arc eroding, by perforating metallic disks with high energy beams or by partially vapor-depositing a light impermeable precipitate on a member of transparent material. It is likewise possible to form the aperture with an end of a fibre optic which has a desired cross-section.

Although the invention is predominantly employed in reproduction technology and in opto-electronic scanning, it can, however, likewise be employed in such instances in which a rastered master is scanned, for instance, line-wise, so that the recording onto a light-sensitive medium ensues directly from the light reflected from the master through the aperture and over a corresponding optical device for imaging. Such an optical device is, for example, a lens system and/or optical fibers.

A preferred area of use is given, for example, in printing technology when one proceeds from rastered masters for producing the printing form. The case frequently occurs that the original master is no longer available and that only an already rastered print or rastered color separation is available.

A significant use of the invention lies in the so-called offset-rotogravure conversion frequently practiced today. An example is disclosed in the German AS No. 28 05 874.

We claim:

1. A method of scanning in the field of reproduction techniques, particularly in opto-electronic image scanning to prevent Moiré in a recorded image when scanning a rastered master comprising the steps of:
   (a) Clamping a master with a raster grid with raster meshes,
   (b) Providing an electronic light receiver having a light sensitive surface and a diaphragm with an aperture to allow light, which is emitted by an illuminated master to be received by said sensitive surface to generate an electronic signal for further processing, said aperture having a shape and size corresponding to an elementary cell of a plurality of cells with each of said cells having an arbitraily contoured area of at least the area of one raster mesh, the raster grid of the master being covered without any overlapping and without gaps by the totality of said elementary cells and each single elementary cell being aligned in such a manner that the relative positioning of elementary cells and raster meshes is constant over the area of the whole master, said clamping of the master positioning the master with the aperture of said diaphragm being aligned to execute the scanning process approximately parallel to the alignment of the elementary cells in the raster grid of the master, and
   (c) Arbitrarily moving the diaphragm and master relative to each other to provide the scanning.

2. A method according to claim 1, wherein the arbitrarily contoured area is a coherent area.

3. A method according to claim 1, wherein the arbitrarily contoured area is a non-coherent area.

4. A diaphragm for a sensitive surface of an electronic light receiver utilized in an opto-electronic image scanning for reproduction of a rastered master, said diaphragm having an aperture corresponding in shape and size to an elementary cell, said elementary cell having an arbitrarily limited surface corresponding to the surface of at least one raster mesh of the rastered master which is being scanned, a plurality of said elementary cells covering the raster grid of the master without any overlapping and without gaps, and each of the elementary cells being aligned in such a manner that the relative positioning of elementary cell and raster meshes is constant over the area of the whole master.

5. A diaphragm according to claim 4, wherein the arbitrarily contoured area of the cell is a coherent area.

6. A diaphragm according to claim 4, wherein the arbitrarily contoured area of the cell is a non-coherent area.

* * * * *